United States Patent
Schaad et al.

(10) Patent No.: US 9,932,948 B2
(45) Date of Patent: Apr. 3, 2018

(54) VALVE FOR METERING A FLUID

(71) Applicant: Robert Bosch GmbH, Stuttgart (DE)

(72) Inventors: Andreas Schaad, Maulbronn (DE); Joerg Abel, Berlingen (DE); Juergen Maier, Ottmarsheim (DE); Martin Buehner, Backnang (DE); Matthias Boee, Ludwigsburg (DE); Olaf Schoenrock, Stuttgart-Weilimdorf (DE); Philipp Rogler, Stuttgart (DE); Stefan Cerny, Bietigheim-Bissingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 66 days.

(21) Appl. No.: 15/219,974

(22) Filed: Jul. 26, 2016

(65) Prior Publication Data

US 2017/0030312 A1 Feb. 2, 2017

(30) Foreign Application Priority Data

Jul. 27, 2015 (DE) ........................ 10 2015 214 171

(51) Int. Cl.
*F16K 31/10* (2006.01)
*F02M 51/06* (2006.01)
*F02M 61/10* (2006.01)
*F16K 31/06* (2006.01)

(52) U.S. Cl.
CPC ........ *F02M 51/0625* (2013.01); *F02M 61/10* (2013.01); *F16K 31/0665* (2013.01); *F16K 31/0696* (2013.01); *F16K 31/10* (2013.01)

(58) Field of Classification Search
CPC F02M 51/0625; F02M 61/10; F16K 31/0665; F16K 31/0696; F16K 31/10
USPC .............. 251/129.19, 129.2, 337; 239/585.4, 239/585.5
See application file for complete search history.

(56) References Cited

U.S. PATENT DOCUMENTS

| | | | | |
|---|---|---|---|---|
| 3,549,119 A | * | 12/1970 | Sellers | ................ F16K 31/0655 251/129.15 |
| 3,800,817 A | * | 4/1974 | Gropp | ..................... F16K 25/00 137/242 |
| 4,564,170 A | * | 1/1986 | Gaines | ..................... F16K 1/46 251/357 |

(Continued)

FOREIGN PATENT DOCUMENTS

DE 10360330 7/2005

*Primary Examiner* — John Bastianelli
(74) *Attorney, Agent, or Firm* — Norton Rose Fulbright US LLP; Gerard Messina

(57) ABSTRACT

A valve for metering a fluid, which is used in particular as a fuel injector for internal combustion engines, includes an electromagnetic actuator and a valve needle, which is actuatable by the actuator, and is used for actuating a valve closing body, which interacts with a valve seat surface to form a seal seat. An armature of the actuator has a through hole, through which the valve needle extends. The armature is guided on the valve needle movably and with clearance. Furthermore, a stop surface which is fixed in place with respect to the valve needle is provided, on which the armature strikes with its end face in conjunction with an actuation. During an axial alignment of the armature with respect to the valve needle, an angle offset is predefined between the stop surface and the end face of the armature.

11 Claims, 2 Drawing Sheets

(56) References Cited

U.S. PATENT DOCUMENTS

| | | | | |
|---|---|---|---|---|
| 6,367,769 B1* | 4/2002 | Reiter | ................ | F02M 51/0671 239/585.5 |
| 6,510,841 B1* | 1/2003 | Stier | ................ | F02M 51/0625 251/129.15 |
| 6,520,434 B1* | 2/2003 | Reiter | ................ | F02M 51/0685 239/533.11 |
| 6,702,252 B2* | 3/2004 | Ben-Asher | .......... | F16K 31/0655 251/129.19 |
| 6,799,734 B1* | 10/2004 | Hans | ................ | F02M 51/0685 239/585.1 |
| 6,808,133 B1* | 10/2004 | Stier | ................ | F02M 51/0614 239/585.5 |
| 8,528,842 B2* | 9/2013 | Hoang | ............... | F02M 51/0685 239/585.1 |
| 2003/0047626 A1* | 3/2003 | Maier | ................ | F02M 51/0671 239/585.5 |
| 2004/0021109 A1* | 2/2004 | Okuda | ................ | F16K 31/0655 251/86 |
| 2011/0057059 A1* | 3/2011 | Yamamoto | ......... | F02M 51/0675 239/584 |

* cited by examiner

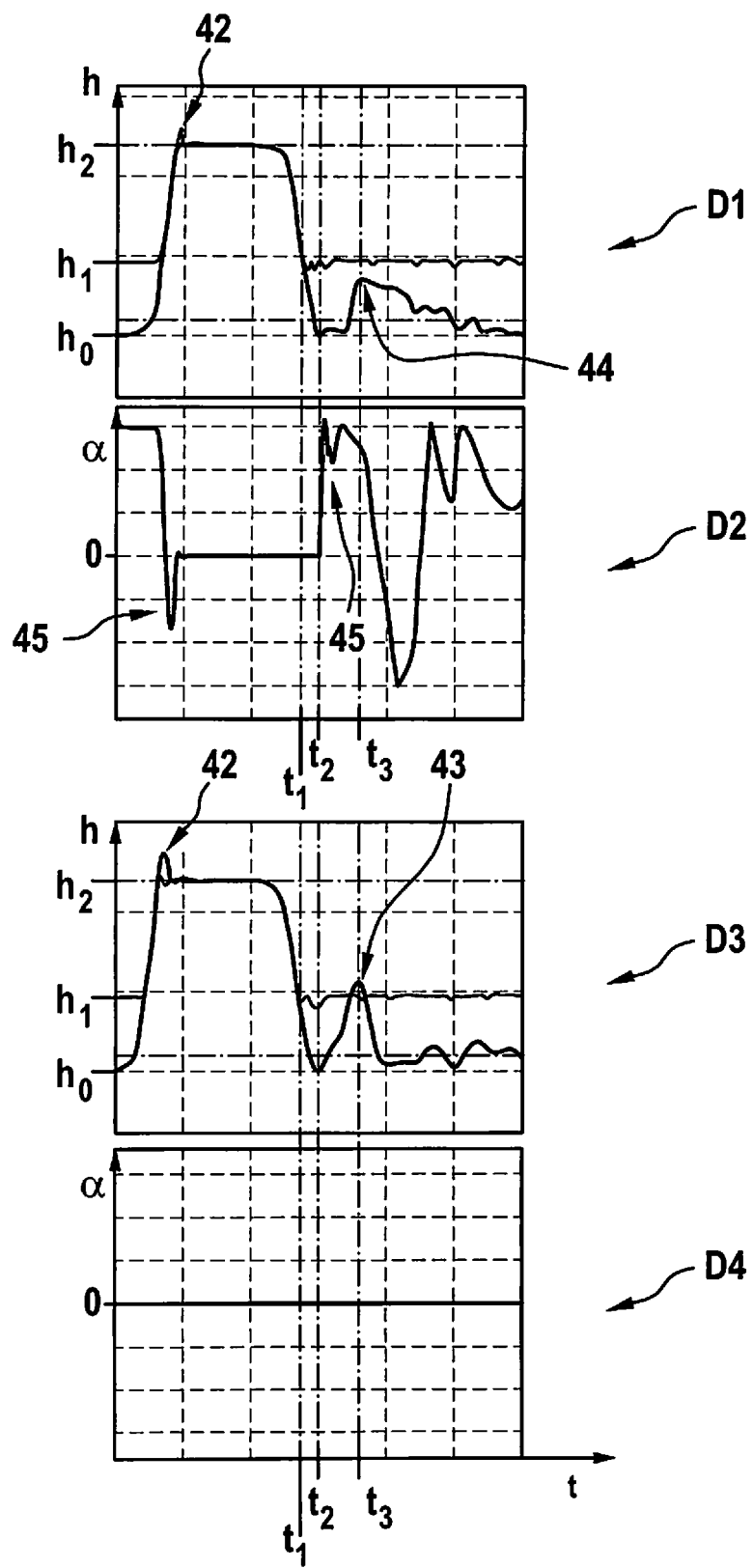

VALVE FOR METERING A FLUID

CROSS REFERENCE

The present application claims the benefit under 35 U.S.C. § 119 of German Patent Application No. DE 102015214171.3 filed on Jul. 27, 2015, which is expressly incorporated herein by reference in its entirety.

FIELD

The present invention relates to a valve for metering a fluid, in particular a fuel injector for internal combustion engines. The present invention relates especially to the field of injectors for fuel injection systems of motor vehicles, in which fuel is preferably directly injected into combustion chambers of an internal combustion engine.

BACKGROUND INFORMATION

A fuel injector for fuel injection systems of internal combustion engines is described in German Patent Application No. DE 103 60 330 A1. The fuel injector includes a valve needle, which interacts with a valve seat surface to form a seal seat, and an armature connected to the valve needle, to which a restoring spring is applied in a closing direction, and which interacts with a solenoid coil. The armature is situated in a recess of an outer pole of the magnetic circuit and has a collar, which is formed circumferentially on the armature having a triangular cross section. Seal-dependent hydraulic damping of the armature results due to this shape of the collar. The damping takes place with respect to the opening movement, while the closing movement takes place nearly unobstructed, so that the fuel injector may be closed rapidly.

SUMMARY

A valve according to the present invention may have the advantage that improved design and functionality are enabled. In particular, improved multiple injection capability with short pause times may be achieved in a design having an armature free travel.

In the valve for metering the fluid, the armature, which is used as a solenoid armature, is not fixedly connected to the valve needle, but rather is mounted floating between stops. Such stops may be implemented by stop sleeves and/or stop rings. Via at least one spring, the armature is adjusted in the idle state at a stop, which is fixed in place in relation to the valve needle, whereby the armature is in contact there. During the activation of the valve, the complete armature free travel is available as an acceleration distance.

In contrast to a fixed connection of the armature to the valve needle, the momentum arising due to the acceleration of the armature may be used during the opening. The valve needle may therefore also be reliably opened at higher pressures with equal magnetic force. Hence, a dynamic mechanical reinforcement results. The participating masses are decoupled, so that the resulting impact forces on the seal seat are divided into two momenta.

However, specific problems arise, which are linked to such a floating mount of the armature. During the closing of the valve, the problem arises that the armature rebounds after striking on the stop, so that in the extreme case, the armature may pass through the complete armature free travel once again and still have sufficient energy when subsequently striking on the opposing stop that the valve needle is lifted briefly out of its seat once again. Undesired post-injection may take place in this way, which, in addition to increased fuel consumption, also results in increased pollutant emissions. However, even if the armature does not pass through the complete armature free travel, the armature still requires some time until it settles again and arrives in the starting position. In the event of an interim activation, robust valve function does not result, which is significant especially in the case of multiple injections with brief pause times between the injections. For example, the impact momenta may be increased or reduced, and in an unfavorable case, the valve may possibly even no longer open, since the impact momentum is no longer sufficiently great for this purpose.

Due to the guidance of the armature on the valve needle with clearance and the angle offset between the stop surface on the valve needle and the end face of the armature, upon striking of the armature on the stop surface, a part of the translational movement is advantageously converted into rotation or tumbling movement, so that damping therefore results in this way. Such damping may possibly assist already existing damping and/or implement a direction-dependent portion. In addition, less energy may be transferred to the valve needle due to the angle offset, which reduces mechanical wear particularly on the seal seat.

Depending on the embodiment of the valve, armature bouncing may therefore be prevented, more robust multiple injection capability may be implemented with short pause times, and/or lower impact momenta may be achieved upon closing. In particular, a lower impact momentum during closing furthermore has advantages in this case with respect to less wear on the armature, a stop sleeve, or the like and on the valve closing body and the valve seat surface. Functional changes over the service life and possible noise development are thus also reduced.

Substantial advantages may result due to improved damping particularly on the stop, which is relevant for the closing of the valve. Specifically, a lower rebound height may be ensured, whereby armature bouncing is avoided and therefore undesired post-injections are prevented. More rapid settling of the armature furthermore enables improved multiple injection behavior.

In particular, the option of direction-dependent damping of the armature enables further advantages. The above-mentioned advantages, such as lower impact momentum upon closing and lower wear thus achieved, and also improved multiple injection capability, may be implemented in particular, without the opening behavior being influenced by resulting, but possibly undesired damping. Damping is therefore preferably implemented particularly during the closing of the valve.

An embodiment according to present may has the advantage, on the one hand, that the armature may be designed having end faces parallel to one another, for example. In this way, in particular a largely axially-symmetrical design of the armature is possible, which is favorable for the opening and closing behavior. On the other hand, the angle offset may be fixed in this design in a simple way via an additional stop element, which is welded to the valve needle, for example.

In an example embodiment, the armature may advantageously be damped during the closing to reduce a rebound.

Refinements according to present invention may have the advantage, inter alia, that advantageous damping is possible by way of the rotational and/or tumbling movement of the armature. In this case, additional damping may take place particularly due to the liquid fluid if the armature rotates and/or tumbles in the fluid.

A refinement according to present invention may have the advantage that damping via the ring gap is optionally possible. In this case, the ring gap may be selected in such a way that, on the one hand, throttling of the fluid flowing past as a result of the displacement by the armature is possible, but on the other hand, the armature does not contact the inner wall of the housing.

An example embodiment may have the advantage that a simple embodiment of the valve needle and an adaptation to the particular application is possible. The stop element may be welded at an incline onto the valve needle, for example. The stop element may advantageously have, in an alteration to inclined welding, a design having an inclined ring or an inclined sleeve also being possible.

An adaptation to the particular application is possible by way of a computer simulation or experimental compensation. In the possible embodiments, an alignment of the armature, which takes place on the valve needle or the longitudinal axis of the valve needle, occurs during the opening, the armature being able to interact with a further stop surface fixed in place in relation to the valve needle and/or a further stop surface which is fixed in place in relation to the housing for this purpose. During the subsequent closing, a reproducible behavior for the damping results due to the impact on the stop surface, at which the angle offset exists.

Therefore, for example, a stop sleeve may be welded at an incline onto the valve needle in a defined way, so that a translational movement of the solenoid armature in the valve closing phase is partially converted upon striking on the stop sleeve into a rotational movement. The armature may be additionally damped by the rotation or the tumbling of the solenoid armature in a liquid fluid. Furthermore, an inclined stop between the armature and the stop sleeve causes less energy transfer to the valve needle and therefore less mechanical wear on the valve seat (seal seat).

BRIEF DESCRIPTION OF THE DRAWINGS

Preferred exemplary embodiments of the present invention are explained in greater detail in the following description with reference to the figures, in which corresponding elements are provided with corresponding reference numerals.

FIG. 2 shows a signal flow chart including multiple diagrams to explain the functionality and embodiment of the valve of the exemplary embodiment shown in FIG. 1.

DETAILED DESCRIPTION OF EXAMPLE EMBODIMENTS

Figure 1:
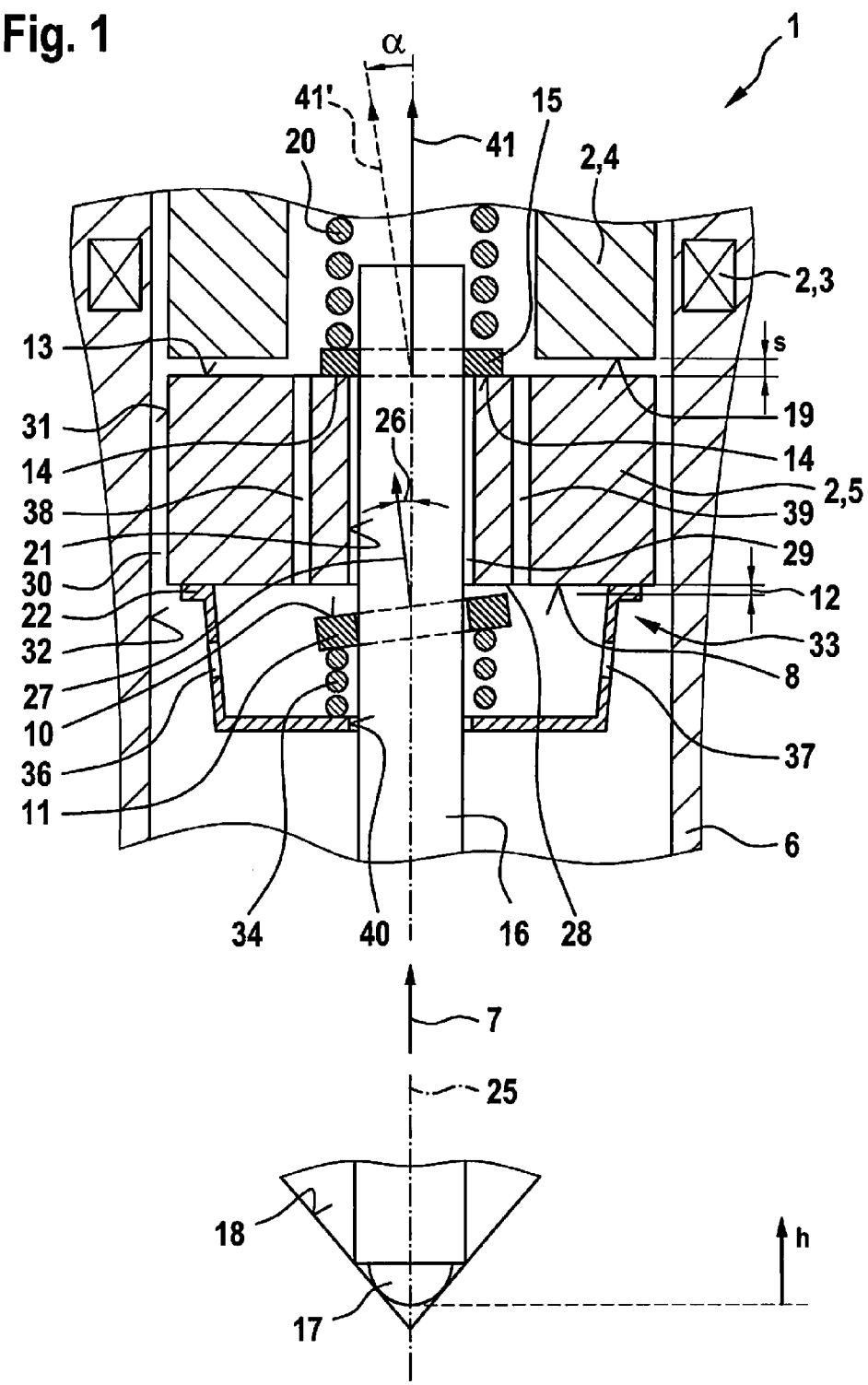
FIG. 1 shows a valve in a schematic sectional detail view corresponding to one exemplary embodiment of the present invention.

FIG. 1 shows a valve 1 for metering a fluid in a schematic sectional detail view corresponding to one exemplary embodiment. Valve 1 may be designed in particular as a fuel injector 1. One preferred application is a fuel injection system, in which multiple such fuel injectors 1 are designed as high-pressure injectors 1 and are used for direct injection of fuel into associated combustion chambers of the internal combustion engine. Liquid or gaseous fuels may be used as fuel in this case.

Valve 1 has an actuator 2, which includes a solenoid coil 3, a pole body 4, and an armature 5. Pole body 4 is situated fixed in place in a housing 6 in this case, which is partially formed from a ferromagnetic material, since it is part of the magnetic circuit.

By energizing solenoid coil 3, the magnetic circuit is closed, whereby actuation of armature 5 in an opening direction 7 takes place. In a starting position, armature 5 is still located in this case having its end face 8 on a stop surface 10 of a stop ring 11. After passing through an armature free travel 12, armature 5 strikes with its further end face 13, which faces away from end face 8, on a further stop surface 14 of a further stop ring 15, which is shown in FIG. 1. Armature 5 has a through hole 21, through which a valve needle 16 extends, armature 5 being guided on valve needle 16.

Proceeding from the situation shown in FIG. 1, in which a seal seat between a valve closing body 17, which is actuatable by valve needle 16, and a valve seat surface 18 is still closed, armature 5 entrains valve needle 16 via a stroke h, a stroke of armature 5 being set by a gap width s. This is because after passing through gap width s, armature 5 strikes with its further end face 13 on a further stop surface 19, which is formed on pole body 4 and is therefore fixed in place.

The inertia of valve needle 16 may result in a further increase of stroke h of valve needle 16, whereby valve needle 16 virtually swings freely. During the return movement, which is caused by a restoring spring 20, and which takes place when solenoid coil 3 is deenergized, valve needle 16 initially entrains armature 5. The seal seat is closed again when valve closing body 17 strikes against valve seat surface 18. Armature 5 subsequently strikes against stop surface 10 of stop ring 11.

In contrast to further stop surfaces 14, 19, which are aligned perpendicularly with respect to a longitudinal axis 25 of valve needle 16, stop surface 10 is tilted by an angle offset 26 in relation to longitudinal axis 25. In this case, a vector (arrow) 27 is shown, which may be considered to be a normal vector 27 in the case of a level stop surface 10. This vector 27 is tilted by angle offset 26 in relation to the longitudinal axis 25. Stop ring 11 may be welded at an incline onto valve needle 16 for this purpose.

Armature 5, during movement opposite to opening direction 7, it initially comes into contact with stop surface 10 at a point 28 of end face 8. Tilting of armature 5 subsequently takes place.

Armature 5 has through hole 21, through which valve needle 16 extends. In this case, a clearance between through hole 21 of armature 5 and valve needle 16 is illustrated by a ring gap 29. This clearance enables tilting and tumbling of armature 5 within housing 6.

Furthermore, a ring gap 30 is provided between an outer side 31 of armature 5 and an inner wall 32 of housing 6. Ring gap 30 is predefined in this case in such a way that a contact of inner wall 32 of housing 6 by armature 5 is prevented. This means that ring gap 30 is sufficiently wide.

An interior 33 of housing 6, in which armature 5 is situated, may be filled using a liquid fluid. This liquid fluid may be a liquid fuel or also a separate pressure fluid. Due to the tumbling movement in interior 33, which is then filled with the liquid fluid, further damping results, which occurs in addition to the damping which results from the conversion of the translational movement along longitudinal axis 25 into the rotational or tumbling movement.

To hold armature 5 in the closed state in a starting position, an armature free travel spring 34 is additionally provided. It acts via a spring cage 35 on armature 5, spring cage 35 being connected at a collar 22 to end face 8 of armature 5. Spring cage 35 may have suitable openings 36, 37, to enable a through flow of a fluid, in particular a fuel, which flows via through holes 38, 39 of armature 5. Furthermore, an opening 40, in particular a circular opening 40, is predefined in such a way that tilting of armature 5 is not obstructed by spring cage 35.

FIG. 1 shows a vector 41, which may be considered to be a normal vector 41 with respect to further end face 13 of armature 5. In this case, the orientation of vector 41 is relevant, as it is for vector 27. If vector 41 is oriented in parallel to longitudinal axis 25, which includes the case where vector 41 lies on longitudinal axis 25, an axial alignment of armature 5 is provided with respect to valve needle 16 or longitudinal axis 25 of valve needle 16. Proceeding from this axial alignment, armature 5 may be tilted, which results in tilting of vector 41 by tilt angle α into, for example, a vector 41'. In this case, the depiction is to be understood to be only for illustration and not to be true to scale.

FIG. 2 shows a signal flow chart including multiple diagrams D1 through D4 to explain the functionality and embodiment of valve 1 of the exemplary embodiment as shown in FIG. 1. Common time t is plotted on the abscissa in this case. Diagrams D1 and D2 show a stroke h and tilt angle α for valve 1 corresponding to the exemplary embodiment. Diagrams D3 and D4 show a stroke h and tilt angle α for a conventional embodiment according to internal related art. Accordingly, tilt angle α is constant and is equal to zero in diagram D4.

The curves indicated in diagrams D1 through D4 may be obtained as a result of a numeric calculation, which considers mechanical and hydraulic variables. An adaptation of valve 1 may take place by computer in this way. An adaptation of valve 1 may also take place experimentally, however, in that the occurrence of a post-injection or stroke h of valve needle 16 is detected, for example.

In diagrams D1 and D3, stroke h of valve needle 16 is to be considered as the opening stroke from value $h_1$, while armature 5 begins its stroke h from value $h_0$. With the energizing of solenoid coil 3, stroke h of armature 5 increases from value $h_0$, valve needle 16 is entrained from value $h_1$, which corresponds to the state shown in FIG. 1. Subsequently, both armature 5 and valve needle 16 move up to stroke $h_2$. Armature 5 strikes against further stop surface 19 there, so that the travel of armature 5 is limited. Overshooting 42 of valve needle 16 is possible, since valve needle 16 does not have to remain stationary at the same time as the armature due to its inertia. Stroke $h_2$ is then maintained for a specific time corresponding to the energizing of solenoid coil 3. Subsequently, the valve is closed again, whereby valve needle 16 strikes with its valve closing body 17 on valve seat surface 18 at point in time $t_1$. Shortly thereafter, armature 5 strikes against stop surface 10 of stop ring 11.

In the conventional embodiment, no tilting of stop surface 10 of stop ring 11 in relation to longitudinal axis 25 is provided. In addition, armature 5 is guided on valve needle 16 in such a way that no substantial tilting with respect to longitudinal axis 25 is possible. This means that a situation is described in diagram D3, in which angle offset 26 vanishes and non-vanishing tilt angles α may not occur. Therefore, a direct strike of armature 5 on stop ring 11 takes place during the closing phase of valve 1. Armature 5 therefore does not necessarily tilt upon striking on stop ring 11 and even reaches further stop ring 15 after the rebound, which also results again in a lift of valve needle 16 at point in time $t_3$, as illustrated in an area 43 of diagram D3. Therefore, an undesired post-injection occurs at point in time $t_3$. Armature 5 subsequently settles and reaches its rest position $h_0$.

In the embodiment of valve 1 corresponding to the exemplary embodiment, a non-vanishing angle offset 26 is set. In this way, the described rotational and tumbling movements of armature 5 occur during the closing phase. At point in time $t_3$, armature 5 may therefore no longer reach further stop ring 15 during the rebound. This is because damping of the amplitude occurs in area 44 of diagram D1 in comparison to diagram D3. Therefore, stroke h of armature 5 after point in time $t_2$ remains less than value $h_1$, so that renewed actuation of valve needle 16 does not occur. After point in time $t_2$, the seal seat therefore remains closed for this activation. Furthermore, settling of armature 5 takes place, so that it comes back into its rest position, which corresponds to stroke $h_0$.

In diagram D2, tilt angle α is plotted, which virtually indicates the orientation of armature 5 with respect to longitudinal axis 25. At the beginning of the activation, armature 5 rests on stop surface 10, which is inclined by angle offset 26, so that a positive tilt angle α results. During the acceleration of armature 5 and subsequent impact on further stop surface 14, which is fixed in place in relation to valve needle 16, a reorientation of armature 5 takes place, which results in brief tilting into the negative range, i.e., to the right of longitudinal axis 25 in FIG. 1 of vector 41, as shown in diagram D2 in area 45. At the latest, the striking on pole body 4 aligns armature 5. During the movement against opening direction 7, the orientation of armature 5 is initially maintained here. From point in time $t_2$, where valve needle 16 drops into its seat, tilting of armature 5 inevitably takes place in accordance with angle offset 26, which is shown in an area 45 of diagram D2, and subsequent rotational and tumbling movements. These variations in tilt angle α illustrate that a part of the translational energy has been converted into rotational energy. This results in the above-mentioned damping in area 44. Armature 5 may experience an additional movement and therefore hydraulic damping in the liquid fluid (liquid medium) in this case. Furthermore, less energy is transferred to stop ring 11 due to the inclined impact and therefore the mechanical wear between valve closing body 17 and valve seat surface 18 is reduced.

As shown by way of the comparison of diagrams D1 and D2 to diagrams D3 and D4 that a conversion of the translational energy into rotational energy and damping takes place in valve 1 corresponding to the exemplary embodiment of the present invention, while such a conversion does not take place in the case of a conventional embodiment (diagrams D3 and D4).

The present invention is not restricted to the described exemplary embodiments.

What is claimed is:
1. A valve for metering a fluid, comprising:
an electromagnetic actuator;
a valve needle actuatable by the actuator, the valve needle to actuate a valve closing body, which interacts with a valve seat surface to form a seal seat, an armature of the actuator having a through hole, through which the valve needle extends, wherein the armature is movable on the valve needle and is guided with clearance; and
a stop surface, which is fixed in place with respect to the valve needle, on which the armature strikes with an end face in conjunction with an actuation, wherein an angle offset is predefined in an axial alignment of the arma- ture with respect to the valve needle between the stop surface and the end face of the armature.

2. The valve as recited in claim 1, wherein the valve is a fuel injector for an internal combustion engine.

3. The valve as recited in claim 1, wherein at least one of: i) the stop surface, which is fixed in place with respect to the valve needle, and on which the armature strikes with an end face in conjunction with an actuation, has the angle offset with respect to a longitudinal axis of the valve needle, ii) the valve needle or the longitudinal axis of the valve needle is oriented perpendicularly to the end face of the armature during the axial alignment of the armature with respect to the valve needle, and iii) the valve needle or the longitudinal axis of the valve needle is oriented perpendicularly to the end face of the armature during the axial alignment of the armature with respect to the longitudinal axis of the valve needle.

4. The valve as recited in claim 1, wherein the stop surface, which is fixed in place with respect to the valve needle, is designed as a stop surface close to the valve closing body, on which the armature strikes during a movement taking place against an opening direction.

5. The valve as recited in claim 1, wherein the angle offset between the stop surface and the end face of the armature is predefined in such a way that upon striking of the armature on the stop surface, at least one of a rotational and a tumbling movement of the armature is initiated.

6. The valve as recited in claim 1, wherein the armature is enclosed by a liquid fluid.

7. The valve as recited in claim 1, wherein a ring gap is provided between an outer side of the armature and an inner wall of the housing, and the ring gap is predefined in such a way that a contact of the inner wall of the housing by the armature is prevented.

8. The valve as recited in claim 1, wherein the stop surface is formed on a stop element, which is fixedly connected to the valve needle.

9. The valve as recited in claim 8, wherein the stop element is designed as a ring-shaped or sleeve-shaped stop element, and a through hole of the stop element having the angle offset extends through the stop element.

10. The valve as recited in claim 1, wherein the angle offset is set in such a way that the armature, after a rebound which takes place upon closing of the seal seat, carries out a rebound stroke which is less than an armature free travel.

11. The valve as recited in claim 1, wherein the armature has a further end face, which faces away from the end face, the valve needle or a longitudinal axis of the valve needle is oriented perpendicularly to the further end face upon an axial alignment of the armature with respect to the valve needle, and at least one further stop surface is provided, on which the armature strikes with its further end face in conjunction with an actuation, the valve needle or the longitudinal axis of the valve needle being oriented perpendicularly to the further stop surface during the axial alignment of the armature with respect to the valve needle.

* * * * *